I. HANTEN.
AUTOMOBILE FRICTION STEERING DEVICE.
APPLICATION FILED JULY 17, 1916.

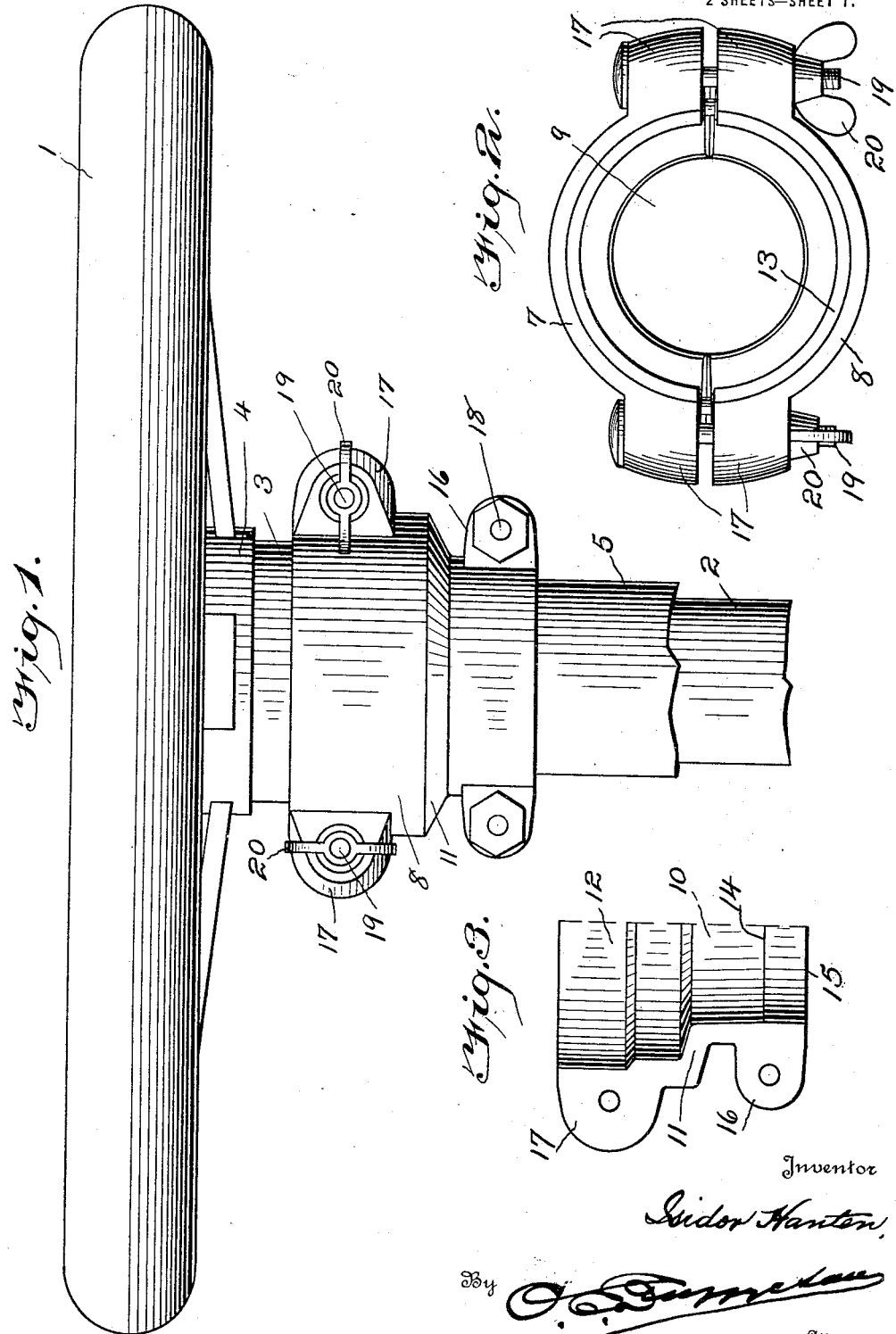
I. HANTEN.
AUTOMOBILE FRICTION STEERING DEVICE.
APPLICATION FILED JULY 17, 1916.
1,220,104.
Patented Mar. 20, 1917.
2 SHEETS—SHEET 1.
Inventor
Isidor Hanten,
By
Attorney

1,220,104.

Patented Mar. 20, 1917.
2 SHEETS—SHEET 2.

Inventor
Isidor Hanten,
By
Attorney

UNITED STATES PATENT OFFICE.

ISIDOR HANTEN, OF WATERTOWN, SOUTH DAKOTA.

AUTOMOBILE FRICTION STEERING DEVICE.

1,220,104.   Specification of Letters Patent.   Patented Mar. 20, 1917.

Application filed July 17, 1916. Serial No. 109,845.

*To all whom it may concern:*

Be it known that I, ISIDOR HANTEN, a citizen of the United States, residing at Watertown, in the county of Codington and State of South Dakota, have invented certain new and useful Improvements in Automobile Friction Steering Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automobiles, but more particularly to the steering apparatus thereof, and the invention has for its object to provide a simple, cheap and efficient device for applying a light drag or friction on the steering wheel of an automobile, so that the road shocks and jars which are imparted to the front wheels of an automobile are absorbed to such an extent that the steering wheel of the machine, which is grasped by the driver, is relieved from the jerking and uncomfortable shocks and jars; thereby rendering the driving of an automobile under rough or poor road conditions, less laborious, less fatiguing and more pleasant.

With this object in view, the invention consists in the novel construction of the friction steering device, and particularly in the arrangement of the parts which provide for the adjustment of the extent of the drag or friction so as to render the device quickly and easily applicable to varying road conditions.

Referring to accompanying drawings:

Figure 1 is an elevation of an automobile steering wheel and the friction steering device, and steering post, the steering column being broken away.

Fig. 2 is a top plan view of the friction steering device.

Fig. 3 is a fragmentary elevation of one of the members of the friction steering device.

Like numerals of reference indicate the same parts throughout the several figures, in which—

Figure 4:
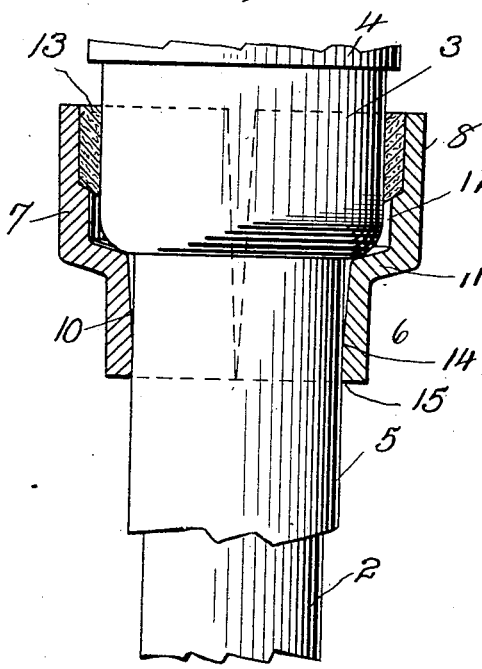
Fig. 4 is a vertical sectional view through the friction steering device illustrating the same as lightly or moderately exerting a drag or friction on the steering post of an automobile.

1 indicates the steering wheel of an automobile, 2 indicates the steering post which is usually supplied with an enlarged portion 3 directly under the hub 4 of the steering wheel 1; and 5 indicates the permanent steering column through which the steering post 2 passes in the usual manner.

6 indicates the friction steering device, which includes two sections 7 and 8, each of which is a duplicate of the other, and as will appear from the accompanying drawings, each section when placed in proper position with relation to the other section, forms a substantially circular arrangement having a differential bore 9, the lowermost portion 10 of said differential bore, being the smaller, a shoulder 11 being formed between the lower portion 10 and the upper enlarged portion 12.

Arranged internally of each of the sections 7 and 8 and preferably set in the wall of each section 7 and 8, and extending to the upper edge of each section is preferably a leather, fiber or raw hide insert 13, the inner surface of which extends normally beyond the inner surface of the larger portion 12 of the differential bore 9.

Figure 5:
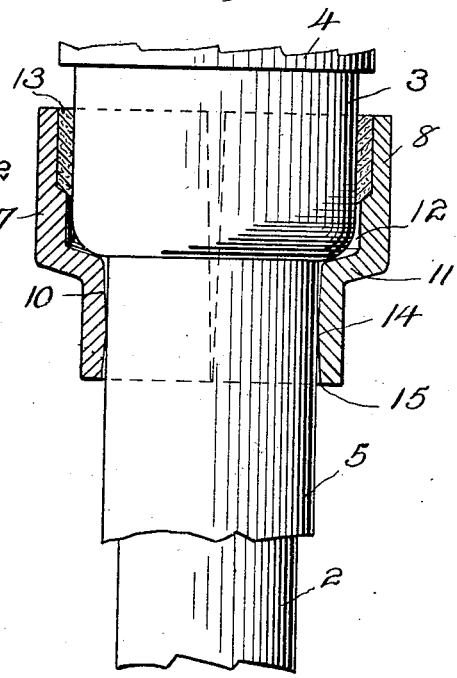
Fig. 5 is a similar view illustrating the device as being closely and tightly positioned to impart a greater degree of drag or friction on the steering post of an automobile.
Figure 6:
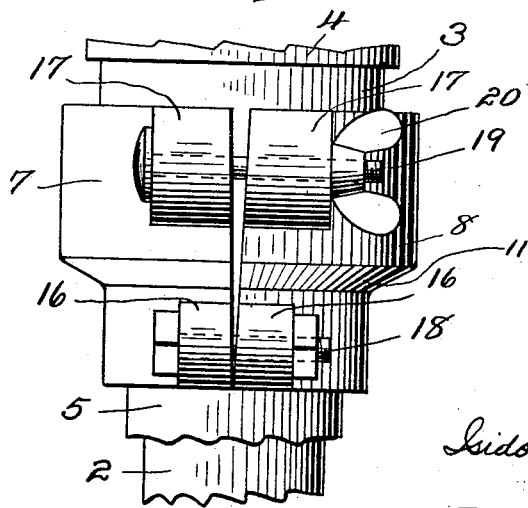
Fig. 6 is an elevation of the friction steering device illustrating more particularly the attaching mechanism.

Referring to Figs. 4 and 5,

It will be seen that the lower portion of the smaller lower bore 10 is slightly chamfered from the point 14 to the bottom edge 15 of each of the sections 7 and 8, for a purpose which will be hereinafter fully described.

Referring now particularly to Figs. 1, 2, 3 and 6,

It will be seen that each of the sections 7 and 8 are provided with a pair of lower registering lugs 16, and are each provided with a pair of upper registering lugs 17, the lower lugs 16 accommodating a pair of transverse fastening bolts 18, while the upper lugs 17 carry a pair of transverse adjusting bolts 19, each bolt 19 being provided with a wing nut 20 for ready adjustment of the said bolts 19, as will be perfectly apparent from an inspection of the accompanying drawings.

Having thus fully described the several parts of this invention, its operation is as follows:

The two sections 7 and 8 forming the friction steering device are applied and positioned as shown in the accompanying drawings with the lower bore 10 of the device encompassing and engaging the permanent steering column and the upper enlarged portion 12 extending over the enlarged portion 3 of the steering post, the insert 13 of which encompasses and engages said enlarged portion 3 in the manner as shown.

The transverse fastening bolts are set up so as to draw the chamfered portion of the lower bore 10 into close contact and engagement with the steering column 5, so as to cause the device to bind and clamp the said steering column 5. When the device has been so positioned the wing nuts 20 on the upper transverse bolts 19 are set up so as to draw the insert 13 into engagement with the enlarged portion 3 of the steering post 2, in the manner as is illustrated in Fig. 4. This causes a slight drag or friction to occur between the enlarged portion 3 and the insert 13 of the friction steering device. When, however, it is desired to increase this drag or friction between the said parts, the wing nuts 20 are set up so as to bring the insert 13 into close frictional contact with the enlarged portion 3 of the steering post 2.

As the friction between the insert 13 and the enlarged portion 3 is increased, the tendency of the lower portion of the device to slip on the permanent steering column 5, is proportionately increased. In order to effectually guard against slipping of the lower portion of the device relatively to the steering column 5, the lower portion of the lower bore 10 is chamfered, as heretofore suggested, so that the drawing up of the wing nuts 20 to compress the upper enlarged bore of the device, causes the lower portion of the device to pivot on the point 14 of the chamfered portion, in the manner as shown in Fig. 5, thus causing a greatly increased clamping action between the point 14 of the device and the permanent steering column 5.

By means of this construction any desired extent of drag or friction can be imparted to the steering post and steering wheel of an automobile to take up the usual road shocks and jars without causing the friction device from slipping with relation to the permanent steering column 5.

While the accompanying drawings illustrate the preferred embodiment of this invention, it is, of course, evident that the same is susceptible to changes in the construction and arrangement of the parts, and I consider myself clearly entitled to any and all changes and modifications as fall within the limit and scope of the appended claims.

What I claim as new and desire to secure by Letters Patent of the United States is:

1. A device for imparting a drag or friction to the steering wheel of an automobile including two duplicate mating sections provided with a differential bore, the lowermost portion of which is the smaller, fastening means for clamping the sections about the permanent steering column of an automobile, the uppermost and larger portion of the differential bore encompassing a portion of the movable steering mechanism of an automobile, a piece of suitable material in each of said sections in the uppermost enlarged portion of the differential bore for immediate frictional contact with a portion of the movable steering mechanism, and means for adjusting said sections together to increase the said frictional contact substantially as described.

2. A device for imparting a drag or friction to the steering wheel of an automobile including two mating sections provided with a differential bore, the lowermost portion of which is the smaller, fastening means for clamping the sections about the permanent steering column of an automobile, the uppermost and larger portion of the differential bore encompassing a portion of the movable steering mechanism of an automobile, a piece of suitable material in each of said sections in the uppermost enlarged portion of the differential bore for immediate frictional contact with a portion of the movable steering mechanism, and means for adjusting said sections together to increase the said frictional contact substantially as described.

3. A device for imparting a drag or friction to the steering wheel of an automobile including two mating sections having a central bore, means for clamping one portion of said bore about the permanent steering column of an automobile, the other portion of said bore being adapted to encompass a portion of the movable steering device of an automobile, and a piece of suitable material in each of said sections for immediate contact with said portion of the movable steering mechanism, and means for clamping the said members into frictional contact with a portion of the movable steering device.

4. A device for imparting a drag or friction to the steering wheel of an automobile including two mating sections having a central bore, means for clamping one portion of said bore about the permanent steering column of an automobile, the other portion of said bore being adapted to encompass a portion of the movable steering device of an automobile, and means for clamping the said members into frictional contact with a portion of the movable steering device.

5. A device for imparting a drag or friction to the steering wheel of an automobile including a pair of mating members provided with a central bore, means for clamping a portion of the bore about the permanent steering column of an automobile, the other portion of said bore being adapted to encompass a portion of the movable steering device of an automobile, the portion of said bore which clamps the stationary steering column being chamfered to provide a point of extreme contact between said sections and the stationary steering column, and means for clamping the sections in frictional contact with a portion of the movable steering device to cause a relative movement of the said chamfered portion of the said bore with respect to the permanent steering column to increase the clamping action therebetween.

6. Means for imparting a drag or friction to the steering wheel of an automobile including a device having therein a bore, means for clamping a portion of said bore about the permanent steering column of an automobile, and the other portion of said bore being adapted to encompass a portion of the movable steering mechanism and means for clamping said device in frictional contact with said movable portion of the steering mechanism.

7. Means for imparting a drag or friction to the steering wheel of an automobile including a device for attachment against relative movement to the permanent steering column of an automobile, said device including means for encompassing a portion of the movable steering device of an automobile and including means for clamping said device into frictional contact with a movable portion of the steering device of an automobile.

In testimony whereof, I affix my signature, in presence of two witnesses.

ISIDOR HANTEN.

Witnesses:
FLORENCE A. BARRON,
C. HUGH DUFFY.

Copies of this patent may be obtained for five cents each, by addressing the "Commissioner of Patents, Washington, D. C."